2 Sheets—Sheet 1.

G. E. NUTTING & J. C. GITHENS.

Assignors to A. C. RAND.

STEAM ROCK DRILL.

No. 10,975. Reissued Dec. 11, 1888.

WITNESSES:

C. N. Benjamin

A. S. Fitch

INVENTORS.

George E. Nutting

Joseph C. Githens

BY

Andrew S. Fitch

Their ATTORNEY

G. E. NUTTING & J. C. GITHENS.

Assignors to A. C. RAND.

STEAM ROCK DRILL.

No. 10,975. Reissued Dec. 11, 1888.

WITNESSES:

C. M. Benjamin

A. S. Fitch

INVENTORS.

George E. Nutting

Joseph C. Githens

BY

Arden S. Fitch

Their ATTORNEY

UNITED STATES PATENT OFFICE.

GEORGE E. NUTTING, OF WALTHAM, MASSACHUSETTS, AND JOSEPH C. GITHENS, OF NEW YORK, N. Y., ASSIGNORS TO ADDISON C. RAND, OF NEW YORK, N. Y.

STEAM ROCK-DRILL.

SPECIFICATION forming part of Reissued Letters Patent No. 10,975, dated December 11, 1888.

Original No. 161,631, dated April 6, 1875. Application for reissue filed November 12, 1888. Serial No. 290,603.

*To all whom it may concern:*

Be it known that we, GEORGE E. NUTTING, now of Waltham, county of Middlesex, State of Massachusetts, and JOSEPH C. GITHENS, of the city, county, and State of New York, both citizens of the United States, have invented certain Improvements in Steam Rock-Drills, of which the following is a specification.

Our invention relates to steam-drills; and it consists in the mode of operating the port-valve of the steam-cylinder, which is effected by a rocking lever actuated directly by the piston in such a manner that the valve moves in the same direction as the piston.

Figures 1, 2:
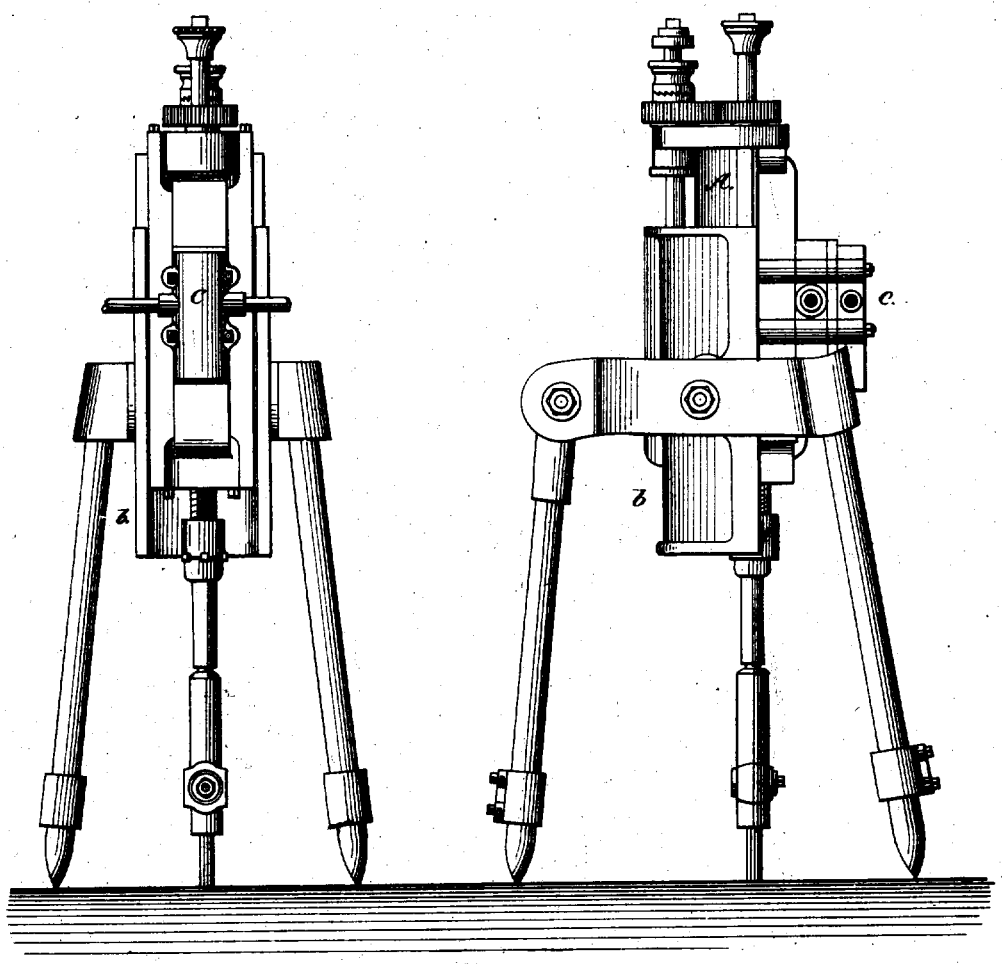
Figure 3:
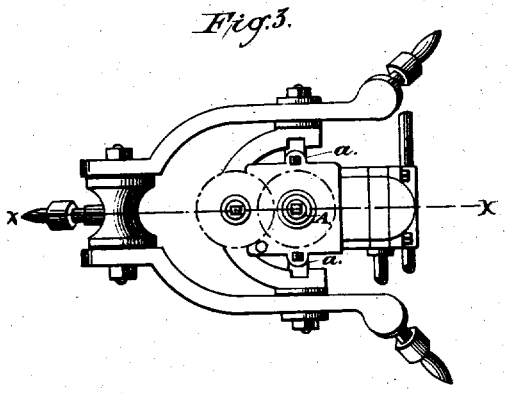
Figure 4:
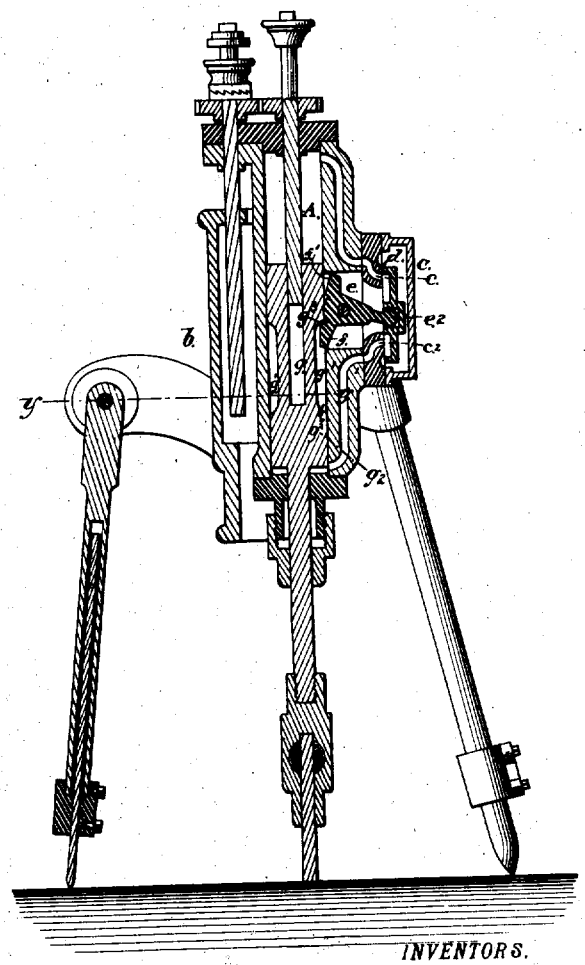
Figure 5:
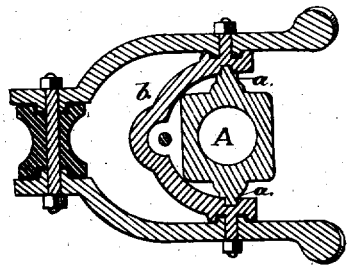

The accompanying drawings are as follows: Figure 1 is an elevation of drill from the side on which the slide-valve is placed. Fig. 2 is a side elevation of drill. Fig. 3 is a plan view. Fig. 4 is a vertical section on line $x\ x$. Fig. 5 is a horizontal section on line $y\ y$.

The drawings represent a steam-cylinder, A, which is provided with external webs, $a\ a'$, for engaging corresponding grooves in a bed or shell, $b$, which is mounted on trunnions having their bearings in a yoke supported by three legs.

The supporting structure, which is commonly called a "tripod," has been fully described in an application for a patent therefor which was filed by us in the United States Patent Office, April 8, 1875, and for and upon which Letters Patent No. 162,302, dated April 20, 1875, were issued to us. We have introduced it into the drawings in this case because of the intimate relation of the supporting structure to the cylinder and for the purpose of giving a clear idea of the nature, purposes, and mode of operation of the invention described herein.

The cylinder is made to slide back and forth in the grooved shell at the will of the operator by means of suitable mechanism. The devices for effecting this purpose (shown in the drawings) are not herein described, because we do not claim them, they being the invention, as we believe, of Addison C. Rand, of the city and State of New York.

The steam-chest $c$ contains the ordinary slide-valve, $d$, for opening and closing the ports $c'$ and $c^2$. The valve is operated by means of the three-armed lever which rocks on the pivot $e'$. The end of the straight arm of this lever engages a recess, $e^2$, in the under side of the valve. The two other arms are curved toward the center of the cylinder, and their ends $f$ and $f'$ alternately project into the cylinder, in which position they are alternately engaged by the piston-head $g$ in its backward and forward movement. The piston-head is elongated and has an annular recess, $g'$, in its periphery.

During the outward movement of the piston the end $f$ of the rocker projects into the recess $g'$. At the end of the outward stroke the wall $g^2$ of the recess engages the end $f$ of the rocker and drives it outward, and thus, by reason of the engagement of the straight arm of the lever in the recess $e^2$, drives the slide-valve in the direction in which the piston is moving, so as to close one port and open the other, and hence reverse the movement of the piston. During the backward movement of the piston the other end, $f'$, of the rocker projects into the recess $g'$, and in its turn is struck by the opposite wall $g^3$ of the recess $g'$, and the valve is thus again reversed, its movement in this case, as before, being in the same direction as the movement of the piston. This coincidence in the direction of the movements of the valve and piston is important in rock-drills, because of the shock to which the structure is subjected when the drill strikes the rock.

By this mode of construction the valve, when it has been reversed, is prevented from being jarred backward by the continued pressure of the periphery of the piston-head upon the end of the rocker which it has engaged.

We do not describe nor claim herein the peculiar construction of our chuck and key for holding the drill-bar.

We claim—

The combination, in the interior of the steam chest and cylinder of a steam-engine, of the three-armed rocking lever, the valve *d*, and the double-headed piston *g*, having an annular recess between the heads and the inclined surfaces $g^2$ and $g^3$, constructed and operating as and for the purpose specified.

Witness our hands this 9th day of July, 1888.

GEORGE E. NUTTING.
JOSEPH C. GITHENS.

Witnesses for George E. Nutting:
ENOS T. LUCE,
GEO. H. SAMPSON.

Witnesses for Joseph C. Githens:
ARDEN S. FITCH,
GEO. H. SAMPSON.